F. C. RINSCHE.
ADDING MACHINE.
APPLICATION FILED JULY 24, 1913.

1,262,702.

Patented Apr. 16, 1918.
7 SHEETS—SHEET 1.

Fig. 1.

Witnesses:
E. R. Barrett
Robert Dobberman

Inventor
Frank C. Rinsche
his Attys

F. C. RINSCHE.
ADDING MACHINE.
APPLICATION FILED JULY 24, 1913.

1,262,702.

Patented Apr. 16, 1918.
7 SHEETS—SHEET 3.

F. C. RINSCHE.
ADDING MACHINE.
APPLICATION FILED JULY 24, 1913.

1,262,702.

Patented Apr. 16, 1918.
7 SHEETS—SHEET 7.

Fig.9.

Witnesses:
E. R. Barrett.
Robert Dobberman

Inventor
Frank C. Rinsche
his Atty's.

UNITED STATES PATENT OFFICE.

FRANK C. RINSCHE, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,262,702. Specification of Letters Patent. Patented Apr. 16, 1918.

Application filed July 24, 1913. Serial No. 780,893.

*To all whom it may concern:*

Be it known that I, FRANK C. RINSCHE, a citizen of the United States, residing at Detroit, in the county of Wayne and State of Michigan, have invented certain new and useful Improvements in Adding-Machines, of which the following is a specification.

The present invention has for its object in general to provide an equipment for adding or calculating machines of the "key-driven" type whereby the power ordinarily derived through manual exertion by way of finger pressure may be supplanted in an efficient and reliable way by electrical impulses. The invention has more especially to do with that type of machine wherein denominational actuators in the form of levers with segmental racks are employed to impel gearing leading to registering wheels. In the form of embodiment of my present invention herein specifically disclosed, the keys which are arranged as usual in denominational rows extending from front to rear serve merely to operate electrical contact devices and to couple differential stop mechanism to the registering levers, the latter being impelled through suitable translating connections of a yielding character.

Besides providing for the performance of addition, in such manner as above indicated, the present invention supplies additional electrical equipment for facilitating the performance of multiplication by the process of repeated addition. Thus through the employment of any one of a set of multiplier digit keys a circuit may be established and contact devices so controlled as to provide for repetition of adding operations in automatic succession to the number represented by the operated digital multiplier key, members of the stop mechanism set for determining the multiplicand remaining set until the requisite number of operations of the machine have been had whereupon there is not only automatic cessation of operation of the machine but automatic release of said members of the stop mechanism.

The invention further extends to an electrical equipment for performing the operation of canceling or zeroizing, which, according to the form of embodiment of the invention herein disclosed, may be brought about by the mere depression of a contact-closing key, the resultant electrical impulse being translated into a cycle of movement of zeroizing mechanism.

In the accompanying drawings, forming a part of this invention, Fig. 2 is a sectionalized left-side elevation of the machine; Fig. 2ª is a detail elevation of certain parts shown at normal in Fig. 2, said parts being out of normal in Fig. 2ª.

Figure 4:
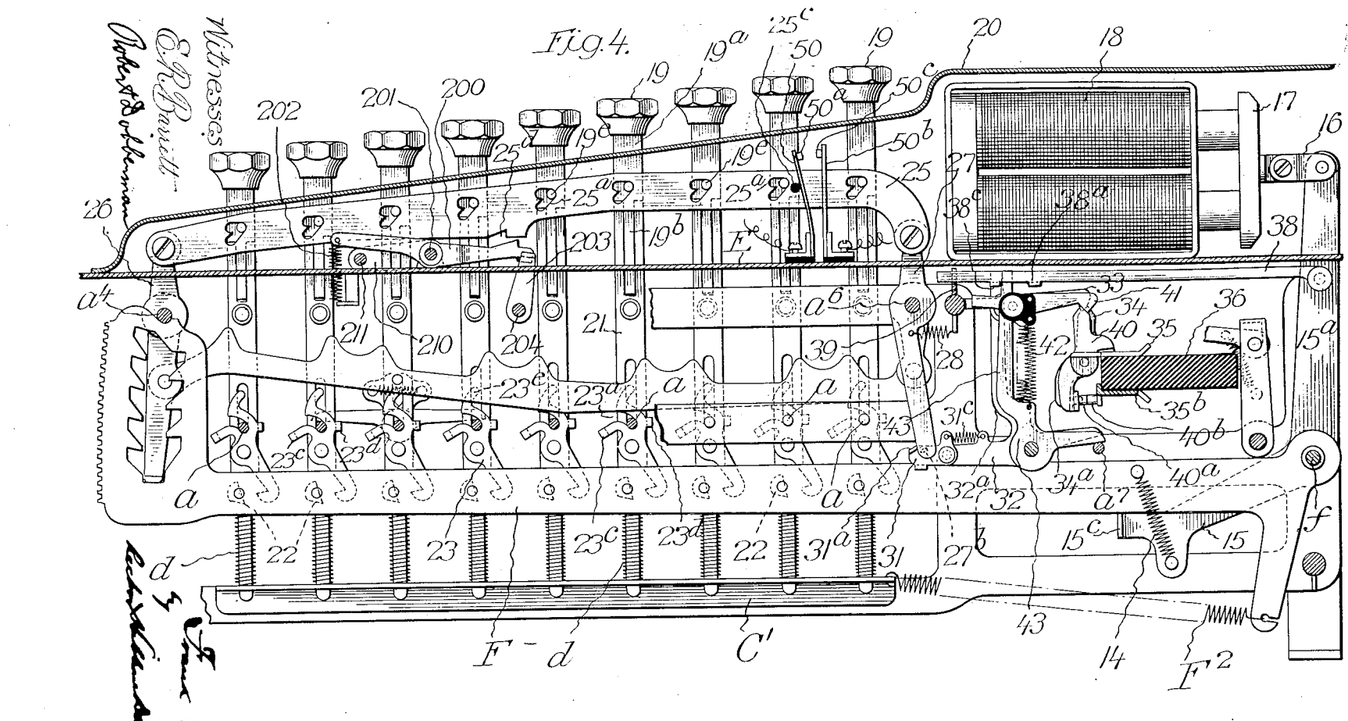
Fig. 4 is a sectional right-side elevation taken substantially on the line 4—4 of Fig. 3.

In so far as the actual registering mechanism is concerned, the machine here shown is substantially identical with the machine disclosed in prior Patents Nos. 1,016,501 and 1,023,168 issued February 6th and April 6th, 1912, respectively, upon inventions of Allen A. Horton and W. J. Pasinski. It will therefore be unnecessary to give a detailed description of this mechanism and it will be sufficient to start with the registering levers F which coöperate at their forward ends with the registering mechanism exactly as described in the aforesaid patents but which do not receive motion as in said patents as a direct result of the manual act of applying finger pressure to the amount keys. In furtherance of the object of the present invention these registering levers are pulled downward by electrical impulses, solenoids being preferably employed whose cores are operatively connected with levers which are in turn yieldingly connected to the respective registering levers. The construction for each denominational order is the same so that a detailed description of one set of devices will suffice for all. Referring more particularly to Fig. 4 the registering lever F is connected by a spring 14 with the forwardly and downwardly extending arm 15 of a bell-crank lever loosely mounted upon frame cross-rod $f$ and having its upwardly extending arm $15^a$ coupled by a link 16 to the cross piece 17 of the core of a horseshoe solenoid 18. Rearward movement of the arm $15^a$ of said bell-crank is limited by contact of a laterally turned end portion $15^c$ of the other arm 15 against the under edge of the registering lever F. When the solenoid is energized the arm $15^a$ of said bell-crank is pulled forward and the arm 15 swung downward and the latter through the medium of the spring 14 pulls down the registering lever as far as it is permitted to go by the stop mechanism brought into action by the depression of an amount key which also closes the circuit through the solenoid. Reference numeral 19 designates the amount keys which extend a short distance above an upper casing plate 20 covering the solenoids, said keys having stems $19^a$ occupying slots in said plate 20. These keys are adapted to be depressed a comparatively slight extent uniformly, the work they have to do being merely that of coupling slide strips 21, in the nature of supplemental key stems, to the registering lever, and that of shifting contact devices to close a circuit through the associated solenoid.

The slide strips 21 work through slots in an upper casing plate E and through slots in lower angular plates C', and these strips are longitudinally slotted to embrace frame cross-rods $a$ which limit their downward movement, all substantially as in the case of the key stems designated D in the above-mentioned Horton and Pasinski patents. For purposes of the present invention, however, these slide strips are not integral with the keys but are in telescopic relation thereto, each strip being bifurcated for a considerable distance at its upper portion and the associated key stem $19^a$ being reduced in width a corresponding distance to form a tongue $19^b$ occupying the bifurcation of the strip. The shoulders at the upper end of the tongue operate upon the upper end edges of the strip to depress the latter sufficiently to effect a coupling of the same with the registering lever and then the strip moves on independently of the key as the said lever is pulled down, the movement of the latter being limited by abutment of the upper end of the strip slot against the frame cross-rod $a$.

Figures 5, 6:
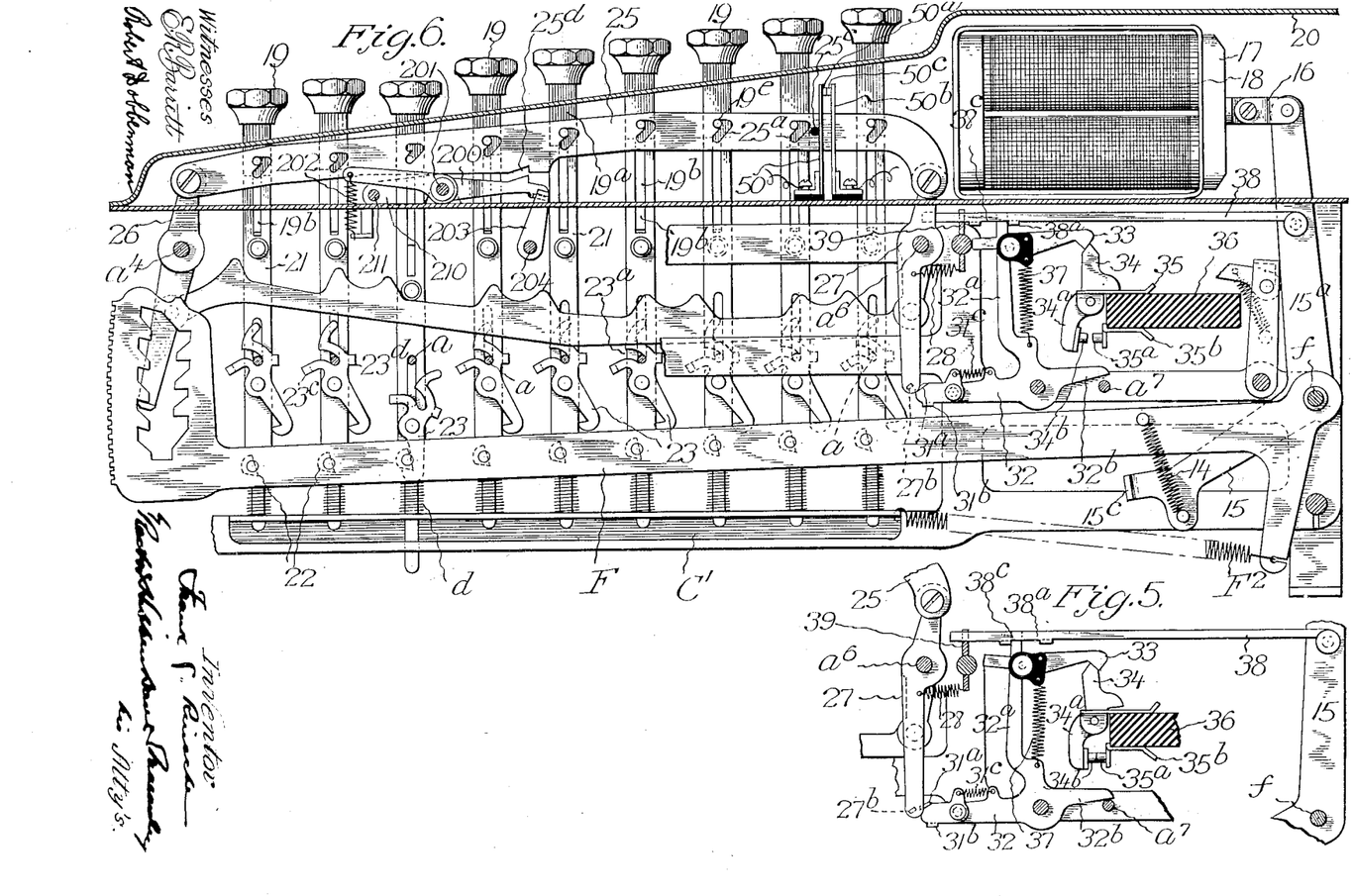
Fig. 5 is a sectional right-side elevation of certain of the parts shown at the right-hand portion of Fig. 4 differently conditioned as a result of depression of an amount key.
Fig. 6 is a view similar to Fig. 4 and illustrating further effects of depression of an amount key.

For coupling purposes the registering lever carries a longitudinal series of downwardly and rearwardly pointing V-shaped studs 22, one for each of the slide strips or supplemental key stems. On each of said strips there is pivotally mounted a hook 23 formed to interlock with one of the said lever studs. Above its pivot the hook is formed with an open cam slot $23^a$ which normally embraces the frame cross-rod $a$ and coöperates therewith to engage the hook with the stud and disengage it therefrom. Normally the cross-rod occupies the bottom portion of the slot as illustrated in Fig. 4 and by reason of engagement with the lower side of the slot holds the hook away from the stud, this condition being brought about through the action of the familiar spring $d$ which normally upholds the key. Upon depression of the key the upper side of the cam slot is forced into engagement with the cross-rod $a$ and the hook swung forward as the slide strip 21 is forced downwardly and in this manner the hook is brought into engagement with the stud as a result of the limited downward thrust of the strip by the key. Movement of the hook is limited by contact of bent-over portions or lips thereof $23^c$ and $23^d$ with front and rear edges of the slide strip 21, and to prevent any possible locking down of the slide strip 21 by reason of the branch of the hook above the cam slot getting in front of the cross-rod $a$ or otherwise being obstructed by it, a rearward arc-shaped extension $23^e$ is formed upon that branch of the upper part of the hook. It will be understood that when the hook and stud have been brought into engagement and the registering lever is pulled down the accompanying movement of the slide strip disengages the slotted upper part of the coupler altogether from the cross-rod as illustrated in Fig. 6, said rod then serving as the means for limiting both the descent of the slide strip and the descent of the registering lever. The extent of downward movement of the lever varies according to the distance of the particular stud in action from the pivot of the lever, this being governed to some extent also by the slight difference in the length of the slots of the slide strips or supplemental stems of the lower value keys. Any overthrow which might otherwise occur through springing of the lever when the higher valued keys are used will be prevented by the same sort of stop devices which are disclosed in the aforesaid Horton and Pasinski patents for a similar purpose, it being noted that the roller studs for operating the stop devices are upon the supplemental key stems or slide strips 21.

Referring now to the other function of the amount keys, to wit, that of operating contact devices to energize the solenoids and still referring to Fig. 4 which illustrates a normal condition, the key stems $19^a$ have studs $19^e$ which engage angular slots $25^a$ in a bar 25 supported at its forward end by radius link 26 journaled on shaft $a^4$ and mounted at its rear on a similar radius link 27 which constitutes the upper arm of a lever pivoted on frame cross-rod $a^6$. The lower arm $27^a$ of this lever is drawn rearwardly by spring 28 and at its lower end has an inclined stud $27^b$ normally projecting under the inclined flange or lip $31^a$ of a wiper piece 31 pivoted upon the forwardly projecting arm 32 of a three-armed lever whose upwardly extending arm $32^a$ carries a pivoted pressure arm 33 for operating the contact device 34. The latter is pivoted to a plate 35 mounted upon an insulation block 36 and has a V-shaped upper end coacting with the V-shaped portion of the said pressure arm in the shifting of the contact device one way or the other, and below its pivot said contact device has an arm $34^a$ which has a contact stud $34^b$ confronting a similar stud $35^a$ on a plate $35^b$ fastened to the under side of the said insulation block.

The normal condition is that illustrated in Fig. 4 wherein as before stated the inclined stud $27^b$ is under the inclined lip or flange $31^a$, the lower arm $27^a$ of the lever 27 being rearward and a lip $31^b$ of the wiper piece $31^a$ being engaged with the under edge of the forwardly projecting arm 32 of the aforesaid three-armed lever, being so held by a spring $31^c$ which connects an upper branch of said wiper piece with a rearwardly located ear of the said arm 32. When any one of the keys is depressed and its stud $19^e$ operates with a camming effect upon the rear side of the inclined leg or branch of the slot $25^a$ and the bar 25 is thereby forced rearwardly, the lever-arm $27^a$ is swung forward and its inclined lug or stud $27^b$ acts with a camming effect against the under side of the wiper piece flange $31^a$. Thereby the three-armed lever is rocked rearward and the V-shaped extremity of the pressure arm 33 (which normally stood forward of the V-shaped extremity of the contact piece 34) is forced over the point of the latter whereupon a spring 37 connecting said pressure arm to the central portion of the three-armed lever snaps the contact stud $34^b$ into engagement with the contact stud $35^a$ (Fig. 5) by reason of the camming coaction of the rear side of the V-shaped end of the contact piece and the forward side of the V-shaped end of the pressure arm. Rocking of the three-armed lever is limited by contact of its rearwardly projecting arm $32^b$ with a frame cross-rod $a^7$.

When the contact is thus made a circuit is closed and the solenoid 18 energized so that immediately the registering lever 12 is pulled down until the slot of the coupled slide strip 21 strikes the cross-rod $a$, the spring 14 then stretching as the solenoid core completes its stroke. In the registering mechanism shown, which is that of the Horton and Pasinski patents, the wheels are advanced upon the return strokes of the registering levers through the power of springs $F^2$ which connect downwardly-extending branches of the levers with the fixed plates $C'$ and are inferior to the springs 14. In order that these springs may take effect to accomplish the registering it is of course essential that the contacts be separated. This is done automatically as the solenoid core reaches the end of its initial stroke. To this end a thrust bar 38 is pivotally coupled to the lever 15 and extends forward over the pressure arm 33 and through a slotted guide plate 39, said bar having a laterally projecting finger $38^a$ (Fig. 3) in rear of an upward extension of the arm $32^a$ of the three-armed lever. Normally said extension is spaced from said finger as illustrated in Fig. 4 and its rearward movement is slight so that when the contact has been made it is still spaced from said finger (Fig. 5) but it is then within the range of movement of the latter so that as the solenoid core reaches the end of its stroke the finger will throw the lever arm $32^a$ back to normal as illustrated in Fig. 6 so that the point of the V-shaped end of the pressure arm 33 is carried forward over the point of the V-shaped end of the contact member 34 and the latter cammed back to normal as also shown in Fig. 6 so that the solenoid is deënergized and its core moved out first by the spring 14 and then by the spring $F^2$. The coupler hook 23 of course returns along with the depressed slide strip 21 as the latter is lifted by its spring $d$ and when the lower side of the cam slot $23^a$ strikes the cross-rod $a$ the hook will be rocked out of engagement with the stud 22 of the lever. It is assumed of course that finger pressure on the key 19 has been released, though it is immaterial at just what particular point this release occurs for the key does not have to stay down after the hook has been coupled to the lever and the latter starts on its downward excursion and if the key is held down beyond the time when the contacts are separated that cannot affect the operation. When the lever arm 32 is rocked back to normal from the position to which it was moved by the stud $20^b$, the wiper piece flange $31^a$ simply moves from the position shown in Fig. 5 to the position shown in Fig. 6 so that when the key is thereafter released the lug $27^b$ wipes over the upper side of said flange rocking the wiper piece on its pivot and then the latter's spring $31^c$ restores this piece so that the normal relation between it and the lever 28 is resumed. The angle slots $25^a$ in the bar 25 provide for the locking out of all other keys while any one key is depressed, as clearly illustrated in Fig. 6.

Figure 3:
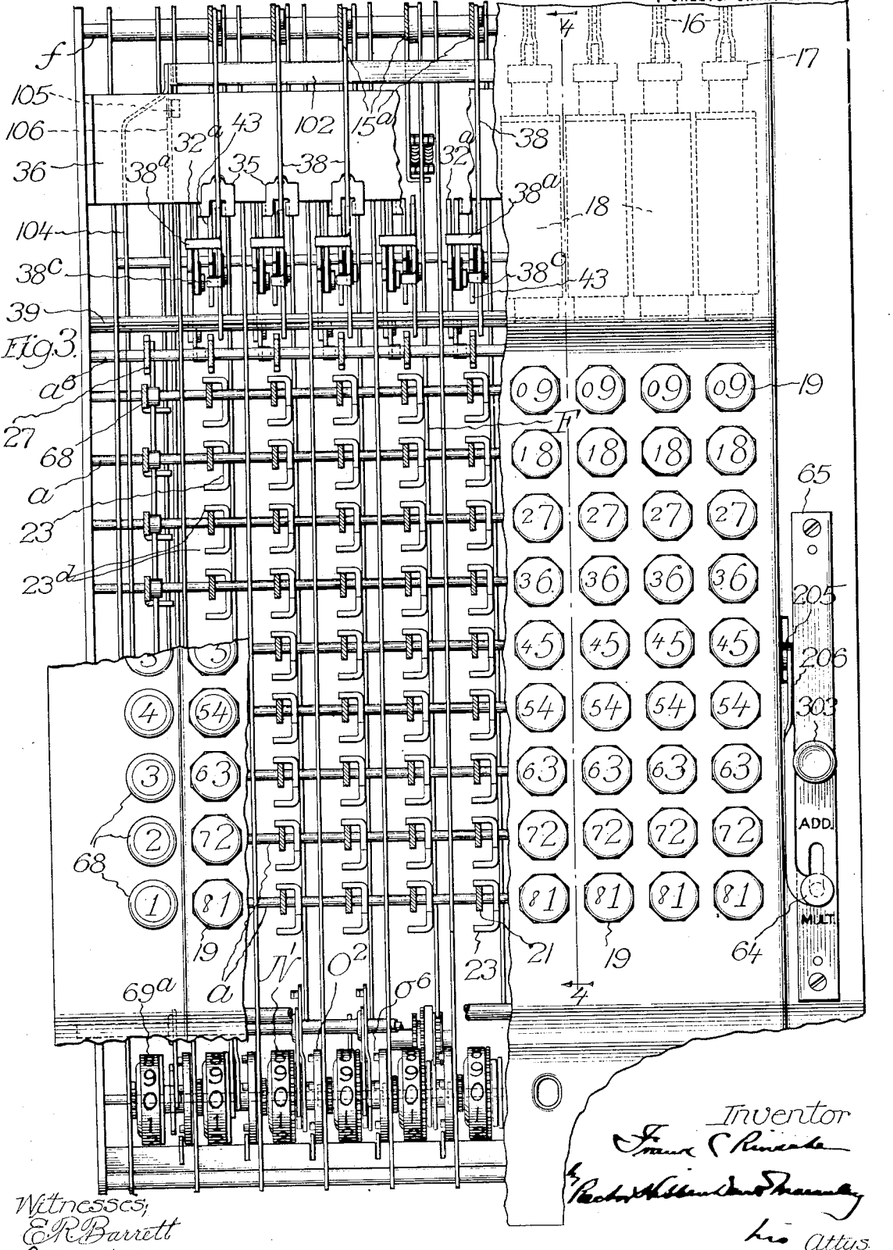
Fig. 3 is a top plan view of the machine with portions of the casing broken away and some interior parts shown in section.

Passing to the matter of multiplication, this involves repeated addition of the multiplicand without repeated depression of keys, so that the contact devices above described are not employed but companion contact devices of a similar character come into play. Thus, referring to Fig. 4 there is pivotally mounted upon the plate 35 a second contact member 40 which is a duplicate of the before-described member 34 and it has on its lower arm a contact stud 40ᵃ to engage a contact stud 40ᵇ on the plate 35ᵇ. This contact member 40 is worked by a pressure arm 41 similar to the arm 33 and similarly connected by a spring 42 to a lever 43. The latter differs however from the lever which carries the pressure piece 33, in that it does not have a forwardy extending arm. It does however have an upward extension with which the finger 38ᵃ of the thrust bar 38 coöperates, said finger being elongated so as to extend in rear of the extensions of both levers as shown in Fig. 3. The extension of the lever 43 also coöperates with a short finger or lug 38ᶜ on said thrust bar 38 extending in front of the lever extension.

Unlike the contact devices first described, these now being considered are normally in engagement as illustrated in Fig. 4, being so held by reason of the fact that the said short finger or lug 38ᶜ holds the lever 43 rearward so that the V-shaped end of the pressure arm 41 is on the rear side of the V-shaped end of the contact member 40. The effect is the same as with the other contact members as to separation by the thrust bar 38 as the solenoid core completes its initial stroke, but is different as to automatic reëngagement of contacts for in the case of the devices now being described the contacts will be again brought together as the solenoid core completes its rear stroke.

Figure 9:
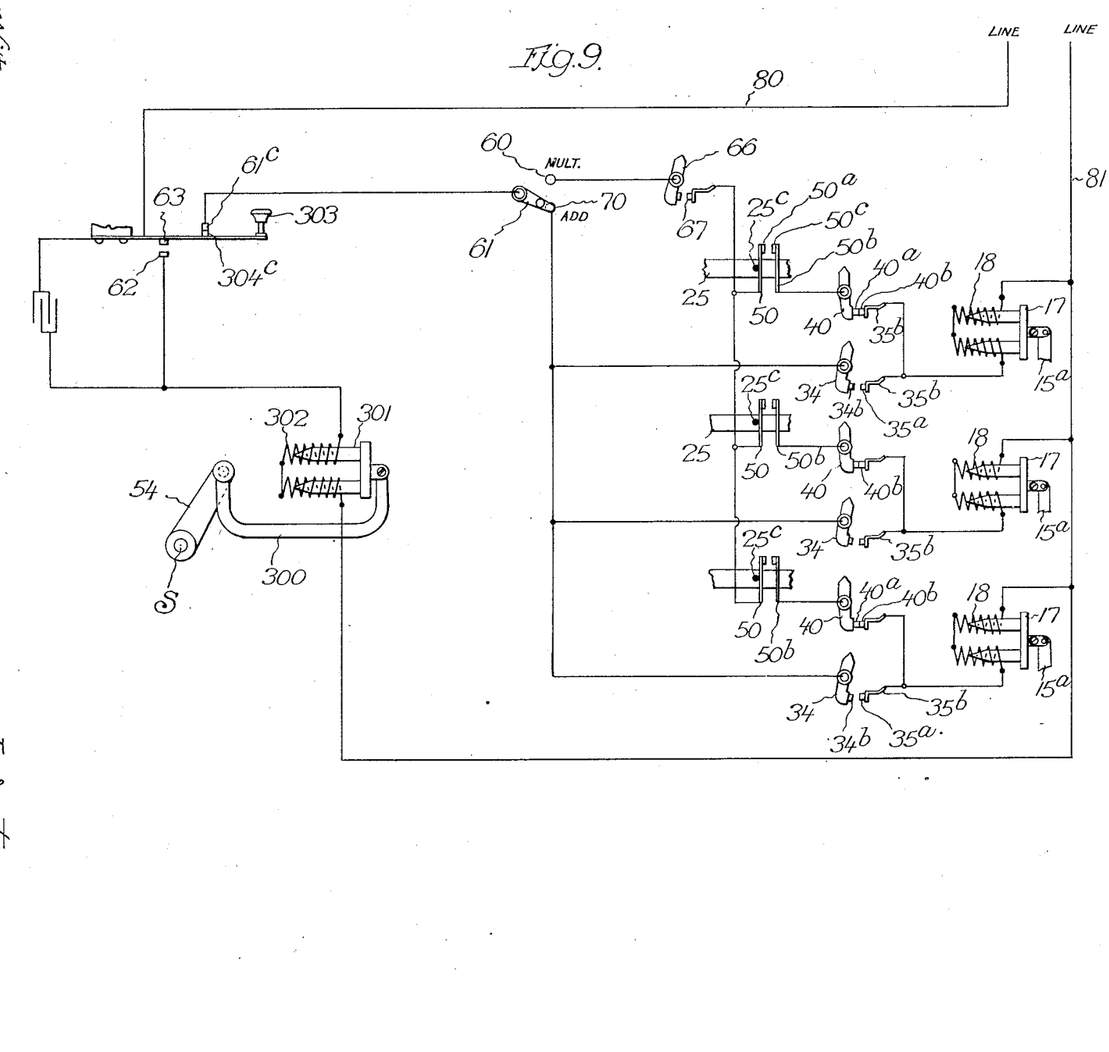
Fig. 9 is a diagrammatic illustration of the electric circuits and contacts.

There being a pair of these secondary contact members for each row of keys and said members being normally in engagement it is necessary to provide supplemental contacts to be closed by the keys so that the solenoids will be energized only in those orders wherein digits of the multiplicand occur. To this end there are mounted upon the horizontal casing plate E pairs of contact members for the respective rows of keys, the members of each pair being normally out of contact. Referring to Fig. 4, 50 designates the movable member of a pair of such contact devices, the same being in the form of a spring strip fastened at its base by a suitable bracket to and suitably insulated from said casing plate E and having a contact stud 50ᵃ at its upper end. The fixed member 50ᵇ of this pair of contact devices is similarly mounted upon the casing plate and has a contact stud 50ᶜ confronting that of the movable member 50. The latter extends just in rear of a stud 25ᶜ of insulating material which is carried by the bar 25. When the latter is forced rearwardly through depression of any one of the keys the contact members will be brought together in an obvious manner. They are in circuit with the previously described members 40 and 40ᵇ, so that with the circuit otherwise closed, through controlling means hereinafter described, the depression of a key will result in energizing the solenoid independently of the first-described contact members 34 and 35ᵃ, though of course in the act of depressing a key these contacts are also brought together. The point to be noted here is that the contacts 40 and 40ᵇ remain engaged while the contacts 34 and 35ᵃ are separated so that as to continued depression of the key the circuit can be maintained by reason of engagement of the third pair of contacts 50 and 50ᵇ. Even in the initial depression of the key when being used for multiplying purposes the coming together of the contact members 34 and 35ᵃ would itself have no energizing effect upon the solenoid, for the reason that a switch is provided for cutting out these contact members. For the same reason the normal engagement of the contact members 40 and 40ᵇ has no effect to energize the solenoids when the machine is in use for simple addition. Reference to the circuit diagram (Fig. 9) may be useful at this point. Here it will be noted that the switch members 40—40ᵇ and 50—50ᵇ are wired in series to a terminal 60, and the contact members 34—35ᵃ are wired in series to a terminal 70 and a switch 61 is arranged to be shifted from one terminal to the other. One line wire 80 is illustrated as in electrical connection with said switch and the other line wire 81 as in series connection with the several solenoids which are wired respectively to the plates 35ᵇ which carry both the contact studs 35ᵃ and the contact studs 40ᵇ.

Figure 1:
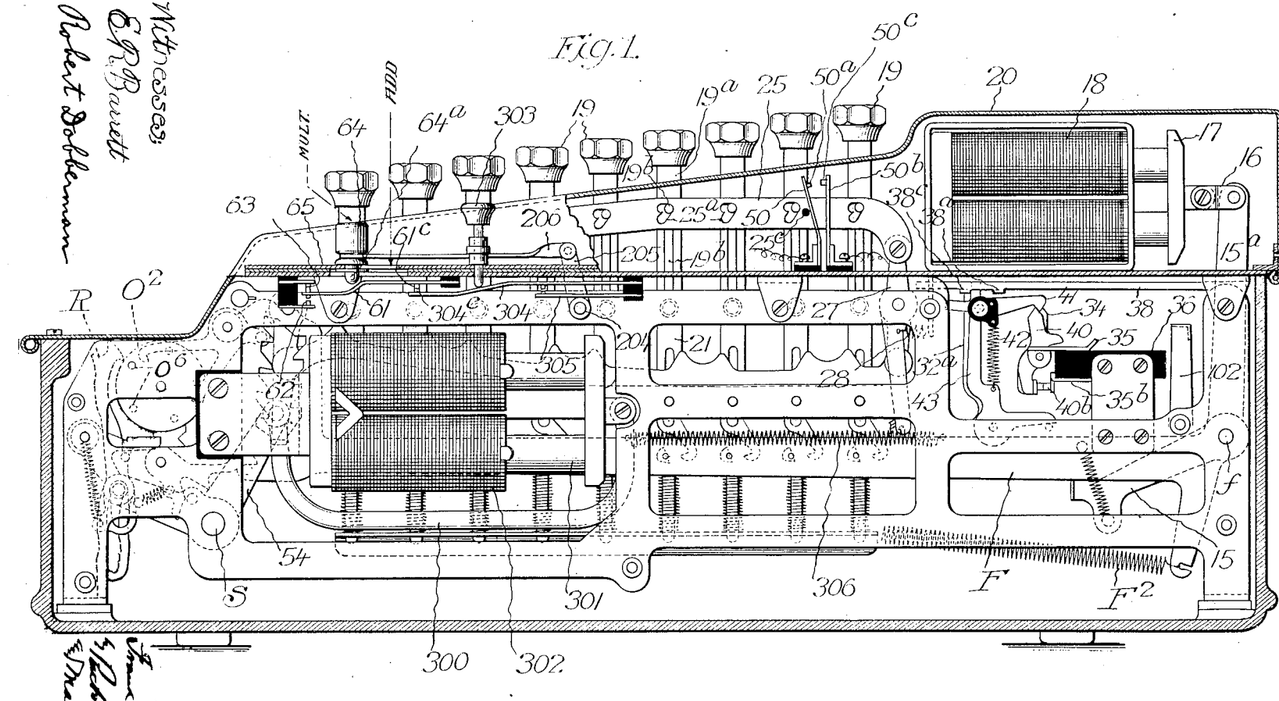
Figure 1 represents in right-side elevation with the inclosing case in section, a machine having the electrical equipment of the present invention.

Referring to Figs. 1 and 3, the controlling switch is shown in the form of a flat spring 61 working between terminal studs 62 and 63 and a slide key 64 is mounted to work back and forth in a slot of a supplemental plate 65 secured to the casing plate E, said key having a short rounded lower end 64ᵃ adapted when the key is slid rearward to engage an inclined portion of the switch 61 so as to depress the latter and change the adjustment from a multiplying to an adding one. The said supplemental plate is preferably inscribed with abbreviations as illustrated in Fig. 3 so that the operator may know at a glance that when the key is forward the switch is set for multiplying and when it is rearward the switch is set for adding.

Since the purpose is to have the machine operate automatically the number of times represented by a multiplier digit it is necessary to control the multiplication circuit further than as above described, in order that it may be closed for the first addition and automatically opened as the last addition is performed. To this end an additional pair of contact members is arranged in the multiplication circuit the same being designated 66 and 67 in the diagram (Fig. 9) where they appear normally separated. There is at the left of the keyboard a special row of keys 68 which are the multiplier keys and depression of any one of which will brink these contact members 66—67 into engagement and will also result in setting an escapement mechanism to count the number of operations and cause them to automatically cease according to the number represented by the particular key depressed. The keys are numbered from one to nine and are of a similar character to the regular keys shown in the Horton and Pasinski patents. Furthermore they operate differentially upon a lever 69 after the manner of the regular keys of the Horton and Pasinski constructions upon their registering levers and this lever 69 similarly operates a numbered wheel 69$^a$ which however is not connected with the adjacent wheel of the registering lever-mechanism to receive a transfer or carry therefrom. Said wheel 69$^a$ merely serves as an indicating wheel to show the multiplier digit when the depressed key 68 is released.

Figures 2, 2A:
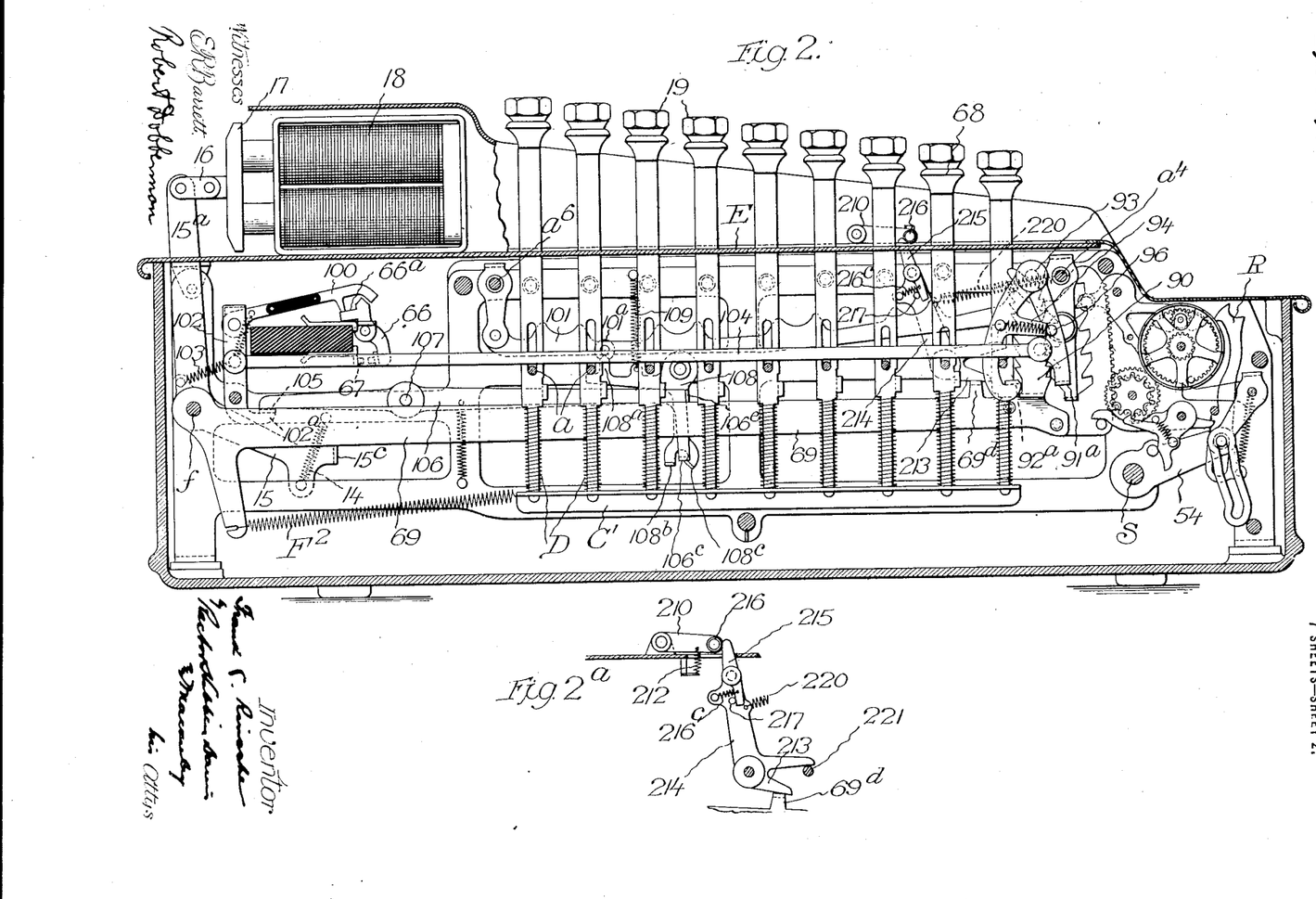
Figure 7:
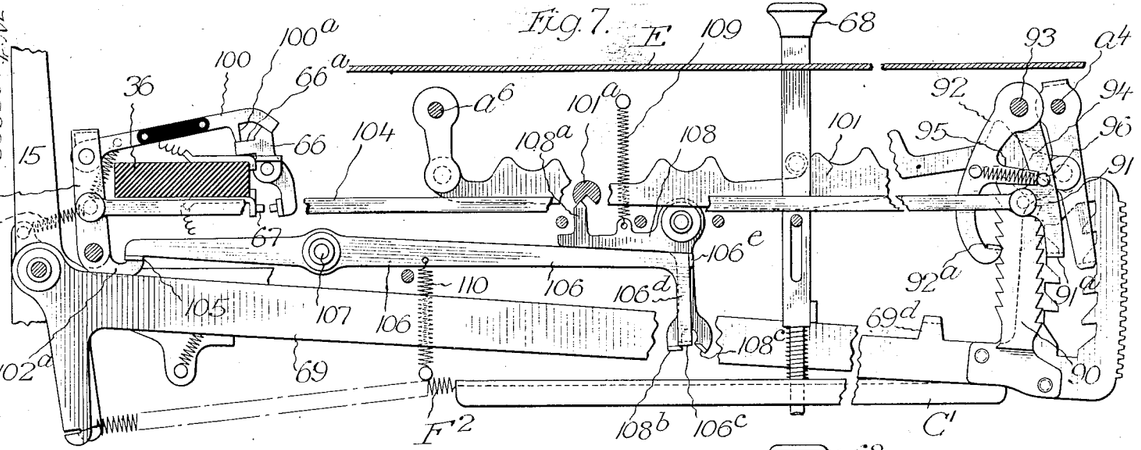
Figs. 7 and 8 are views on the same order as Fig. 2 being intended more especially to illustrate the action of the multiplying devices, Fig. 7 illustrating one of the multiplier keys depressed and Fig. 8 illustrating the effect of release of that depressed key.
Figure 8:
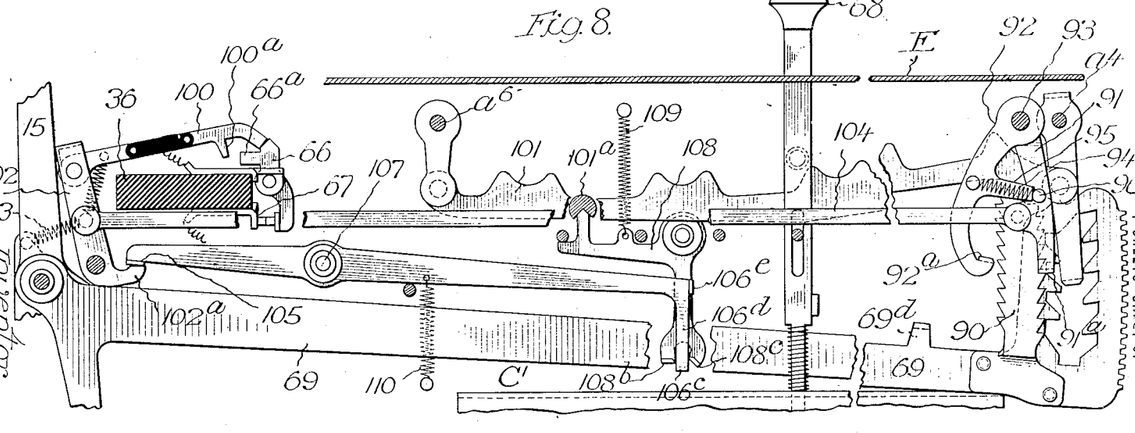

Referring to Figs. 2, 7 and 8, the lever 69 carries an escapement member in the form of a double ratchet rack 90 secured to the said lever and projecting upwardly therefrom, its teeth running along the front and rear sides with abrupt edges facing upward. The balance of the escapement comprises a pair of arms 91—92 hung upon a frame stud 93 and connected together by a spring 94, the arm 92 having a forwardly extending branch 95 which abuts spring-stud 96 on the arm 91 whereby the two arms are held apart. The arm 92 is curved toward the ratchet rack 90 and has a laterally turned portion 92$^a$ extending in rear of the latter and beveled on the forward edge, this laterally turned portion constituting a pallet dog to coöperate with the rear teeth on the ratchet rack. The other arm 91 of the escapement pallet has a similar laterally turned portion 91$^a$ at its lower end to coöperate with the teeth on the front of the ratchet rack.

Normally arm 91 is forward as shown in Fig. 2 and the dog 92$^a$ of arm 92 below the lowermost tooth of the series on the rear edge of escapement rack 90. Upon depression of the rack its teeth successively force the arm 92 rearwardly stretching spring 94 which as soon as any tooth passes pulls said arm forward pulling its dog 92$^a$ over the abrupt edge of the tooth to hold the rack and lever down. The dog 91$^a$ on the other arm 91 is offset or stepped downwardly relative to dog 92$^a$ so that when the latter is withdrawn from engagement with a rack-tooth by rearward swing of arm 92 brought about through rearward swing of arm 91, said dog 91$^a$ will strike the inclined back of the tooth of the front edge of the rack which tooth is next lower than the rear rack tooth engaged by dog 92$^a$.

Obviously, vibration of the pallet will provide for step-by-step rise of the ratchet rack and the lever 69 when one of the keys 68 has been depressed and released,—the lever being forced downwardly against spring F$^2$ which serves as do the other springs similarly designated to normally elevate the lever. It will thus be obvious that depression of the lever 69 to different extents by the multiplier keys, followed by vibration of the escapement pallet in successive operations of the machine will provide for counting the operations according to the value of the depressed key as representative of a multiplier digit.

Coming back now to the multiplier contacts 66 and 67, which as before stated are normally separated, the depression of any one of the multiplier keys 68 operates to bring those contacts together and, through the above described escapement mechanism, to again separate them when the requisite number of operations of the machine have been had.

Referring further to Figs. 2, 7 and 8 the movable contact 66 is of the same form as the before described movable contacts 34 and 40, and the fixed contact 67 is of the same character as the before described contacts 35$^a$ and 40$^b$. Furthermore the shifting of the contact member 66 is effected in a similar manner to the shifting of the contacts 34 and 40, a pressure arm 100 being employed for such purpose and formed with a V-shaped extremity which coöperates with a V-shaped portion of the contact member 66. For a reason which will become clear presently the extremity of the pressure arm 100 is normally spaced a slight extent from the forward side of the V-shaped extremity of the contact member 66, and the latter has a rearwardly projecting branch 66$^a$ upon which a foot 100$^a$ of the pressure arm presses to normally hold the contact separated as illustrated in Fig. 2.

It will of course be understood that when a series of additions are to be performed for multiplying purposes the operation should not start until the number has been predetermined by depression of one of the keys 68. Therefore the bringing together of the contacts 50 and 50$^b$ in the orders where keys 19 are depressed to set up the multiplicand does not have the effect of closing the circuit through the solenoids notwithstanding all of the contacts 40 and 40$^b$ are engaged in pairs. This is all merely preparatory to the closing of the circuit by the bringing together of the contacts 66 and 67. Furthermore the latter contacts should not be brought together until the multiplier key has been fully depressed and released, in order to insure that the escapement action starts properly and that the number of operations of the machine correspond with the ordinal of the depressed key.

The keys 68 coöperate with an overthrow preventing mechanism of the same character as that shown in the Horton and Pasinski patents the same including among other elements a reciprocating cam bar 101. I utilize this cam bar for the purpose of effecting a release of the escapement pallet and movement of the pressure arm 100 rearward for effecting circuit closing movement of the contact member 66. Said pressure arm is pivoted at its rear end to the side piece 102 of a bail and the latter is drawn rearward by a spring 103 and there is also pivotally connected to said side piece a long link 104 which extends forward and is coupled to the pallet arm 91. The bail side piece 102 has a forward and upwardly curved extension 102$^a$ below its pivot, which extension is normally engaged by the laterally turned portion or foot 105 at the rear end of one arm of a lever 106 which is pivoted intermediate its ends upon frame stud 107 and is formed at the forward end to coöperate with an escapement bell crank 108 which in turn coöperates with the aforesaid reciprocating bar 101. The latter carries a stud 101$^a$ which is cut in the under side with a V-shaped notch. In this normally seats the V-shaped end of an upwardly extending branch 108$^a$ of the horizontal arm of the bell crank 108 as shown in Figs. 2 and 8, this engagement being enforced by a spring 109. Obviously whenever the bar 101 is shifted one way or the other by depression of one of the keys 68 the action of the stud 101$^a$ upon the said bell crank branch 108$^a$ will result in depressing the horizontal arm of the bell crank and swinging forward its depending arm. The latter is bifurcated at its lower end and formed with laterally turned portions 108$^b$ and 108$^c$ constituting escapement dogs,—the portion 108$^c$ extending obliquely and the portion 108$^b$ substantially horizontally and the latter being beveled at its forward edge and the former beveled at its upper edge. The latter beveled edge is normally substantially horizontal and, as shown in Fig. 2, a laterally turned portion or foot 106$^c$ at the lower end of a depending branch 106$^d$ of the lever 106 normally extends directly above this beveled edge of the dog 108$^c$.

When the lever 69 is in its normal upward position it engages an upper laterally turned portion or lip 106$^e$ of said lever 106 (Fig. 2) so as to uphold the forward arm of the lever against the tension of a spring 110 (inferior to the spring F$^2$) and so hold the rear arm of the lever 106 down and the bail 102 forward, spring 103 being also inferior to spring F$^2$. As before stated the V-shaped end of the pressure arm 100 is normally held slightly spaced from the contact member 66 as shown in Fig. 2. This has to do with the escapement action of the bell crank 108. When a key 68 is depressed and the bar 101 shifted and the said bell crank thus rocked its dog 108$^c$ is swung clear of the foot 106$^c$ as shown in Fig. 7 and the other dog 108$^b$ brought just under said foot so that a slight downward movement of the forwardly extending arm of the lever 106 ensues and therefore a slight rearward movement of the bail 102 which should not result in any movement of the contact member 66, as it is desirable that the machine shall not begin to operate until the lever 69 is all the way down and of course this slight movement would occur just as the lever starts down and releases the lever 106. As soon as the key is released the bar 101 shifts the other way so that the bell crank rocks back, and, the foot 106$^c$ having dropped below the upper edge of the dog 108$^c$, this foot may now pass between the two dogs as illustrated in Fig. 8 and the lever 106 partake of full movement. This has the effect of permitting the spring 103 to pull back the bail 102 and carry the point of the V-shaped end of the pressure arm 100 rearwardly of the point of the contact member 66 whereupon the latter is engaged with the fixed contact 67 and the first of the series of adding operations occurs. With the rearward swinging of the bail 102 the escapement pallet 91—92 is shifted so that the lever 69 rises one step.

The cross piece of the bail 102 extends in front of all of the lever-arms 15$^a$ as shown in Fig. 3 so that whatever may be the orders in which digits of the multiplicand occur, the bail will be swung forward as the cores of energized solenoids complete their initial strokes, it being understood that the bail normally stands forward of the said lever-arms 15$^a$ as illustrated in Figs. 2 and 7 and when swung rearward by its spring 103 has its cross bar brought against said levers or in close proximity thereto. The effect of the forward swinging of the bail is to again separate the contacts 66 and 67 by reason of the point of the V-shaped end of the pressure arm 100 passing forwardly over the point of the V-shaped end of the contact member 66.

With each succeeding operation the lever 69 rises one step and with the last of the series of operations whose number is determined by the number of the multiplier key depressed, the said lever operates upon the lip or flange 106$^e$ of the lever 106 and forces that lever back to its normal position thus preventing the bail 102 from again swinging rearward (as of course it does in the preceding operations as soon as levers 15 are retracted upon deënergizing of the solenoids), and so preventing the contact members 66 and 67 from again being brought together to close the multiplier circuit. In this restoration of the lever 106 to normal the foot 106ᶜ is drawn up through the space between the dogs 108ᵇ and 108ᶜ, said foot acting against the under inclined side of the dog 108ᶜ so as to slightly displace the bell crank 108 which restores as soon as the foot has passed so that the upper beveled edge of said dog is again under the foot as illustrated in Fig. 2.

It is of course essential that during the successive additions to perform multiplication the amount keys being depressed to set up the multiplicand shall remain depressed, and therefore means are provided under control of the switch key 64 for holding down said keys. To this end the bars 25 are formed with notches 25ᵈ in their lower edges (Fig. 6) and catch levers 200, one for each of said bars, are journaled upon a frame cross rod 201 on the casing plate E, the forward ends of said levers being connected by springs 202 with lower portions of the framework so as to tend to engage the catch projections on the levers with the bar notches. Normally the springs are restrained and the catch projections held away from the bars by a series of latches 203 secured to a rock shaft 204 (Figs. 4 and 6), said latches being in the form of arms having laterally turned end portions. An arm 205 (Fig. 1) secured to the right-hand side of the said rock shaft 204 is connected by a link 206 with the key 64. When said key is slid forward to the multiplying position the catch levers will be released and upon rearward movement of any of the bars 25 the associated catch levers will become engaged with the notches of the displaced bars and prevent their return and therefore prevent rise of depressed keys.

It is desirable that the keys be automatically released when the final adding operation of the multiplying series is performed. To this end the cross rod 201 is journaled in bearings upon the casing plate E so as to constitute a rock shaft and there is secured to it a bail comprising side arms 210 and a cross rod 211 extending under the forwardly projecting arms of the catch levers as shown in Figs. 4 and 6. A spring 212 (Fig. 2ᵃ) attached to the left-hand side piece of this bail holds it down. Means are provided for lifting it when the lever 69 makes its last one-step movement upwardly after having been depressed by one of the multiplier keys. To this end said lever is formed with an upstanding projection 69ᵈ (Figs. 2, 2ᵃ) having a laterally turned end portion which is designed to act upon the lower branch 213 of a lever whose upwardly extending arm 214 carries a wiper pawl 215 to coöperate with a roller 216 on the left-hand side of the bail. Said wiper pawl is held by a spring 216ᶜ against a stud 217 and the arm 214 of the lever is drawn forward by a spring 220 against a stop stud 221. As the lever 69 makes its last one-step movement forward the said projection rocks the arm 214 of the lever rearward causing the wiper pawl 215 to lift the bail and pass by the roller 216. The lifting of the bail thus effected disengages the catch levers from the bars 25 and the latter swing forward as the depressed keys rise. The catches cannot reëngage the notches of the bars because the latter will have passed on forward of the catch projections and the latter upon release of the bail simply strike against portions of the under edges of the bars to the rear of the notches. Then when the key 64 is moved rearward to the adding position the laterally turned portions of the arms 203 will be carried over the laterally turned portions of the catch levers to latch them back.

Referring next to the matter of turning the registering wheels forward to zero, the mechanism for doing this is the same as disclosed in the Horton and Pasinski patents comprising disks O² geared to the numeral wheels N′ (Fig. 3) and having studs oⁿ operated upon by hooks R which are pulled down through suitable connections with a rock shaft S. In the machines of the Horton and Pasinski patents said rock shaft is operated through connection with a handle while the present invention provides electrical connections for operating said shaft. Thus the arm 54 which is secured to said rock shaft is coupled at its end to a yoke 300 which at its opposite end is coupled to the core 301 of a horseshoe solenoid 302. The circuit through the latter is closed by pressure of a key 303 which bears upon a contact member 304 normally separated from a companion member 305 (Fig. 1). (See also diagram Fig. 9). The contact member 304 is in the form of a flat spring and when pressure is removed from the key 303 it separates from the contact member 305 so that the solenoid is deënergized and a spring 306 attached to the yoke 300 pulls the solenoid core and the yoke rearward and rocks the shaft S back to normal. It will be understood that the forward and backward rocking of said shaft causes the numeral wheels to advance from varying positions of registration to zero just as described in the Horton and Pasinski patents.

In order to prevent any possibility of misoperation through simultaneous depression of the zeroizing key and other keys of the machine, I preferably put the various other switches or contacts which control adding and multiplying in circuit with the switch member 304 so that upon depression of the zeroizing key 303 the circuit will be broken.

Thus the plate 304 has at its forward end a contact stud 304ᵉ normally engaging a similar stud 61ᵉ on the switch plate 61. The plate 304 is permitted considerable movement throughout a portion of which the resilient companion plate 305 may also move. Therefore whether the plate 61 is in its upper position closing the multiplying circuit or, whether it has been slightly depressed by the sliding of the keys 64 to the adding position, the contact studs 304ᵉ and 61ᵉ will be separated by depression of the zeroizing key and hence so long as the latter key is depressed no circuits can be closed through any of the adding or multiplying switches or contact members.

The flexing of the spring strip 61 when the key 64 is moved rearward is so slight at the portion where the stud 61ᵉ is located, and the character of the contact plate or strip 304 is such and the location of the zeroizing contact stud thereon, that there is virtually no flexing at the latter point so that when the key 64 is thrust rearward there is no effect to close the circuit through the zeroizing solenoid.

I claim:

1. In a machine of the class described, the combination with accounting devices and actuators therefor; of electrical means for separately impelling the latter under circuit-closing control of said manipulative amount determining devices, stop devices coupled by the latter to the actuators, and automatic circuit-opening means operated by the electrical actuator-impelling means.

2. In a machine of the class described, the combination with accounting devices and actuators therefor; of solenoids for impelling the latter through yielding connections, means for energizing said solenoids under control of said manipulative amount determining means, stop devices coupled by the latter to the actuators, and circuit-opening means operated by the solenoids.

3. In a machine of the class described, the combination of a registering lever; keys; independently movable key-operated members having couplers engageable with the lever in movement of said members by the keys; means for variously limiting movement of the lever according to the coupled key member; electrical means for impelling the lever yieldingly; circuit-closing means operated by the keys; and circuit-opening means operated by the electrical impelling means.

4. In a machine of the class described, the combination of a registering lever; keys; independently movable key-operated members having couplers engageable with the lever in movement of said members by the keys; means for variously limiting movement of the lever according to the coupled key member; electrical means for impelling the lever yieldingly; a movable contact member; a pressure device for shifting the same; key-operated connections for actuating said device to shift the said contact member to circuit-closing position; and connections from the electrical lever-impelling means for operating the said pressure device to shift the said member to circuit-opening position.

5. In a machine of the class described, the combination of a registering lever; keys; independently movable key-operated members having couplers engageable with the lever in movement of said members by the keys; means for variously limiting movement of the lever according to the coupled key member; electrical means for impelling the lever yieldingly; a movable contact member; a pressure device for shifting the same; a lever carrying said pressure device; a reciprocating bar common to the keys; shifter means between the bar and the last-mentioned lever; and connections from the electrical lever-impelling means for retracting said lever.

6. In a machine of the class described, the combination of a registering lever; keys; independently movable key-operated members having couplers engageable with the lever in movement of said members by the keys; means for variously limiting movement of the lever according to the coupled key member; electrical means for impelling the lever yieldingly; a movable contact member; a pressure device for shifting the same; a lever carrying said pressure device and having a pass-by motion-receiving member; a reciprocating bar common to the keys; a lever coupled to the bar and coöperating with said pass-by member; and a thrust-piece coupled to the electrical impelling means and adapted to retract the said pressure-piece-carrying lever.

7. In a machine of the class described, the combination, with registering wheels, means for individually advancing the same varying degrees and for carrying from one to another to cause them to register an accumulation of amounts, electrical means for impelling said wheel-advancing means, mechanism for collectively advancing said wheels from diversified registering positions to zero positions, and electrical means for impelling said mechanism; together with contact-making and breaking means having provisions for opening the circuit of the first-mentioned electrical means as an incident to the closing of the circuit of the zeroizing means.

8. In a machine of the class described, the combination with registering wheels, means for individually advancing the same varying degrees and for carrying from one to another to cause them to register an accumulation of amounts, electrical means for impelling said wheel-advancing means, mechanism for collectively advancing said wheels from diversified registering positions to zero positions, said mechanism including a reciprocating actuator, a solenoid connected to the latter, a contact piece normally in circuit with the first-mentioned electrical means, and a key operating upon said contact piece to open such circuit and close a circuit through said solenoid.

9. In a machine of the class described, the combination of registering wheels, actuators therefor, electrical means for impelling the actuators, keys and stop connections for measuring movement of the latter, contacts for effecting repeat operations of the electrical means, and means for predetermining the number of such repeat operations.

10. In a machine of the class described, the combination of registering wheels; actuators therefor; electrical means for impelling the actuators; keys and stop connections for measuring movement of the latter; normally separated contacts; key-operated trip devices for bringing them together; secondary normally-separated contacts; means for bringing them together and so maintaining them by the keys; normally engaged contacts for circuit-closing at the same points as said first mentioned normally separated contacts; means for separating the latter and the normally engaged contacts by the electrical impelling means and for reëngaging the latter thereby; a pair of normally separated contacts in circuit with said normally engaged contacts; keys; normally restrained connections tripped by the latter for bringing together said last-mentioned normally separated contacts, the same being again separated by the aforesaid electrical impelling means; and means set by the last-mentioned keys for variously timing the return to normal of said restraining connections according to which one of said keys is operated.

11. In a machine of the class described, the combination of registering wheels; actuators therefor; electrical means for impelling the actuators; keys and stop connections for measuring movement of the latter; normally separated contacts; key-operated trip devices for bringing them together; secondary normally separated contacts; means for bringing them together and so maintaining them by the keys; normally engaged contacts for circuit-closing at the same points as said first mentioned normally separated contacts; means for separating the latter and the normally engaged contacts by the electrical impelling means and for reëngaging the latter thereby; a pair of normally separated contacts in circuit with said normally engaged contacts; keys; normally restrained connections tripped by the latter for bringing together said last-mentioned normally separated contacts, the same being again separated by the aforesaid electrical impelling means; and an escapement mechanism differentially set by said last mentioned keys and operatively connected to the movable member of the pair of contacts aforesaid.

12. In a machine of the class described, the combination of registering wheels; actuators therefor; electrical means for impelling the actuators; keys and stop connections for measuring movement of the latter; normally separated contacts; key-operated trip devices for bringing them together; secondary normally separated contacts; means for bringing them together and so maintaining them by the keys; normally engaged contacts for circuit-closing at the same points as said first mentioned normally separated contacts; means for separating the latter and the normally engaged contacts by the electrical impelling means and for reëngaging the latter thereby; a pair of normally separated contacts in circuit with said normally engaged contacts; a pressure piece for shifting the movable member of said pair; a lever carrying said pressure piece; a spring tending to throw said lever to move said contact into engagement with its mate; a set of keys; means operated thereby normally restraining said lever; an escapement member differentially acted upon by the keys of said set; and coacting escapement members operatively connected to said lever; the latter being intermittently retracted by the electrical impelling means.

13. In a machine of the class described, the combination of registering wheels; actuators therefor; electrical means for impelling the actuators; keys and stop connections for measuring movement of the latter; normally separated contacts; key-operated trip devices for bringing them together; secondary normally separated contacts; means for bringing them together and so maintaining them by the keys; normally engaged contacts for circuit-closing at the same points as said first mentioned normally separated contacts; means for separating the latter and the normally engaged contacts by the electrical impelling means and for reëngaging the latter thereby; a pair of normally separated contacts in circuit with said normally engaged contacts; keys; normally restrained connections tripped by the latter for bringing together said last-mentioned normally separated contacts; the same being again separated by the aforesaid electrical impelling means; means set by the last-mentioned keys for variously timing the return to normal of said restraining connections according to which one of said keys is operated; a switch for cutting in and out said pair of contacts; and means controlled by said switch for holding stop connections set for repeatedly measuring movement of the actuators.

14. In a machine of the class described, the combination of a registering lever having a series of catch projections; fixed cross rods; slide strips; coupling hooks pivoted to said strips and cam-slotted to engage said rods and adapted upon depression of the strips to engage said projections respectively; keys having stems separably engaging said strips respectively; electrical impelling means for the lever yieldingly connected therewith; and contacts operated by the keys.

15. In a machine of the class described, the combination of a registering lever; slide strips; couplers on the latter engageable with the lever; keys having stems separably engaging said strips; a bar shifted by the keys; normally separated contacts brought together by said bar; normally separated contacts brought together through operation of said bar; tripping devices operative in the latter connection; contacts normally engaged; electrical impelling means for the lever; means operated thereby to separate the second-mentioned contacts and the last-mentioned contacts and reëngage the latter; multiplier keys; normally separated contacts under control thereof; means for effecting successive coming together and separation of said contacts automatically a varying number of times governed by the particular one of said special keys operated; a switch for cutting in and out said contact devices; and a catch to hold the aforesaid bar displaced, said catch being rendered effective by said switch.

16. In a machine of the class described, the combination with accounting devices and their actuators; of means for individually imparting electrical impulses to said actuators, movement being transmitted to the actuators independently of each other, and manipulative circuit-controlling means with provisions for variously limiting movement of the actuators.

17. In a machine of the class described, the combination with accounting devices and their actuators; of means for individually imparting electrical impulses to said actuators through yielding connections, movement being transmitted to the actuators independently of each other, and manipulative circuit-controlling means with provisions for variously limiting movement of the actuators.

18. In a machine of the class described, the combination with adding mechanism, actuating levers for the several orders thereof, and a series of keys one for each order; of a magnet or solenoid for each order, yielding connections between the armature or core thereof and the actuating lever of the same order, and stop devices controlled by the keys, there being a set of such devices for each series of keys and differentially related to the actuating lever for variously limiting its stroke.

19. In a machine of the class described, the combination with adding mechanism, actuators for the several orders thereof, and a series of keys for each order; of a magnet or solenoid for each order, connections between the armature or core thereof and the actuator of the same order, and means controlled by the keys for differentially measuring the strokes of the actuators.

FRANK C. RINSCHE.

Witnesses:
R. W. FAIRCHILD,
R. S. MIELERT.